May 26, 1936. J. MISIAK, JR 2,042,235
SPEED CHANGE POWER TRANSMISSION
Filed Dec. 29, 1933 3 Sheets-Sheet 1

Inventor:
John Misiak Jr,
By Chindall, Parker & Carlson
Attys.

May 26, 1936. J. MISIAK, JR 2,042,235
SPEED CHANGE POWER TRANSMISSION
Filed Dec. 29, 1933  3 Sheets-Sheet 2

Fig. 2.

Inventor:
John Misiak Jr.
By Chindall, Parker & Carbon
Attys

Patented May 26, 1936

2,042,235

UNITED STATES PATENT OFFICE 2,042,235

SPEED CHANGE POWER TRANSMISSION

John Misiak, Jr., Chicago, Ill., assignor of one-third to Lloyd Z. Peck, Chicago, Ill.

Application December 29, 1933, Serial No. 704,397

21 Claims. (Cl. 74—337)

The present invention relates to improvements in power transmissions, and has for its primary object the provision of a new and improved speed-change power transmission in which the speed adjustments are automatically effected by progressive changes in the torque set up by the driven member.

Another object resides in the provision of a novel power transmission of the foregoing character which comprises an automatic slow speed clutch, and a plurality of automatic overload clutches for controlling the higher speed adjustments.

A further object is to provide a new and improved automatic speed-change power transmission which comprises two parallel driving and driven shaft elements adapted to be connected selectively through any one of a plurality of parallel gear trains of different gear ratios.

Still another object resides in making each shaft element in a plurality of axially aligned shaft sections which are connected for a unitary drive, and which are in telescoping and interfitting engagement, thereby retaining them in a sturdy and compact assembled relation, preventing lateral flexure and misalignment, and permitting ready assembly and disassembly.

A further object resides in the provision of novel means for providing an automatic reverse drive connection between the driven and driving shaft elements when the power to the latter is discontinued.

Another object resides in the provision of a novel automatic overload clutch in which the co-acting clutch elements are urged toward each other by yieldable means, and are urged apart by the torque of the drive against the action of the yieldable means, the torque when exceeding a predetermined value, determined by the pressure of the yieldable means, acting automatically to effect a complete separation of the elements.

A general object resides in the provision of a novel automatic speed-change mechanism which is sturdy and compact in construction, which is efficient and reliable in operation, and which is fully self-adjusting.

Further objects and advantages will become apparent as the description proceeds.

In the accompanying drawings.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the power transmission in its preferred form comprises an external housing 8, a driving or power inlet shaft element 9 adapted to be connected to a suitable source of power (not shown), and a driven or power outlet shaft element 10. A plurality of drive connections of different speed ratios are selectively available through the operation of a plurality of automatic clutches to connect the shaft elements 9 and 10. The clutches are torque controlled, and, as the load on the driven shaft element 10 is gradually decreased, serve to close the drive connections successively to progressively increase the speed ratio between the shaft elements 9 and 10.

While the transmission may be used for various purposes, it is particularly adapted for use in the forward drive of motor vehicles, and hence is shown as comprising three parallel drive connections respectively including three automatic clutches 11, 12 and 13, defining the usual high, intermediate and low speed positions. The clutches operate automatically and in sequence, and obviate the hand shifting of gears ordinarily employed.

Figure 8:
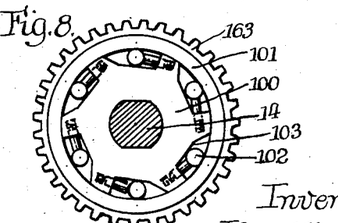
Fig. 8 is a sectional detail view taken along line 8—8 of Fig. 2.

The driving shaft element or assembly 9 consists of three axially aligned shaft sections 14, 15 and 16 which are connected for joint rotation. The first shaft section 14 is connected through an overrunning clutch 98 to an inlet shaft 99 journaled intermediate its ends in a ball bearing 17 in one end wall 18 of the housing 8. The clutch 98 (Fig. 8) comprises inner and outer concentric coupling members 100 and 101 keyed to the shafts 14 and 99. Rollers 102 in notches 103 in the periphery of the member 100 serve to lock the members against relative rotation in one direction. One end of the shaft 99 extends externally of the housing 8 through a packing box 19 for connection to the source of power, and the other end thereof is formed with an axial bore 104. The packing box 19 overlies the outside of the bearing 17, and hence seals the housing 8 at this point against the entry of foreign matter and the loss of lubricant. The shaft 14 is formed in its inner end with an axial bore 20 and on its outer end with an axial extension 105 projecting into the bore 104. The second or intermediate shaft section 15 is tubular in form, and abuts at one end against the inner end of the section 14. The third shaft section 16 is journaled at one end in a ball bearing 21 mounted in the adjacent end wall 22 of the housing 8, and closed externally by a cover plate 23. At its other end, the shaft section 16 has a reduced axial extension 24 which defines an annular shoulder 25 at its base, and which projects through the intermediate shaft section 15 into the bore 20 to hold all of the sections in assembled relation. Thus, the intermediate shaft section 15 is rotatably confined on the shaft extension 24 between the inner end of the first shaft section 14 and the shoulder 25.

The shaft sections 14, 15 and 16 of the driving shaft assembly are connected for joint rotation. In the present instance, the inner end of the inlet shaft section 14 is formed externally with a plurality of peripherally spaced and generally longitudinal spline keys 26 which slidably interfit with similar keys 27 formed in the interior of a sleeve member 28. The latter is formed with a coaxial sleeve 29 of somewhat larger diameter having internal peripherally spaced keys 30 which slidably interfit with similarly spaced keys 31 on the periphery of a disk 32. The keys 30 and 31 are parallel to the axis of rotation. To secure the disk 32 for rotation with the intermediate shaft section 15, the end of the latter adjacent the section 14 is milled with diametrically opposed tangential notches 33, and the disk is formed with a similarly shaped opening 34 fitting into the notches. Thus, the inlet shaft section 14 is continuously connected through a spline coupling, consisting of the keys 26 and 27, the sleeves 28 and 29, the keys 30 and 31 and the disk 32, to the intermediate shaft section 15 for a unitary drive.

A similar coupling is provided for connecting the intermediate shaft section 15 and the third shaft section 16, the corresponding parts of the coupling consisting of keys 35 and 36, sleeves 37 and 38, keys 39 and 40, and a disk 41 having a central opening 42 interfitting with notches 43 in the inner end of the shaft section 16 adjacent the shoulder 25.

In both instances, the disk 32 or 41 is held against endwise movement between the inner end faces of the notches 33 or 43 and the adjacent end of the shaft section 14 or 15. It will be evident that the driving shaft assembly 9 is held together solely by the interfitting and telescoping relationship of the parts, and that it may be readily assembled and disassembled upon removal of the packing 19 and the bearing 17.

The driven shaft element or assembly 10 is parallel to the driving shaft element 9, and also comprises a plurality of axially aligned and end abutting shaft sections 44, 45, 46, 47 and 48. The first or outlet shaft section 44 is journaled in a ball bearing 49 mounted in a wall 50 within a sleeve 51 integral with the wall 22 and defining a housing 52 for a reversing mechanism (not shown). An annular cover plate 53 serves to close the exterior of the bearing 49. Of the shaft section 44, the outer end is adapted to be connected to the part to be driven, and the inner end is formed with an axial bore 54. The first intermediate shaft section 45 is relatively short, and is formed on one end with an axial extension 55 projecting rotatably in the bore 54 and in the other end with a bore 56. Likewise, the second intermediate shaft section 46 is formed in one end with an axial bore 57 and on the other end with an axial extension 58 projecting into the bore 56. The third intermediate shaft section 47 is short and tubular in form. The shaft section 48 is journaled at one end in a ball bearing 59 mounted in the wall 18 and closed externally by a cover plate 60, and at its other end is formed with a reduced axial extension 61 defining an annular shoulder 62 and extending through the intermediate section 47 into the bore 57. Thus, the intermediate shaft sections 45 to 47 are rotatably confined between the inner end of the outlet section 44 and the shoulder 62.

The sections 44, 45, 46, 47 and 48 are also interconnected by a series of couplings for a unitary rotation drive in one direction. Thus, the end of the shaft section 48 adjacent the shoulder 62 has generally longitudinal and uniformly peripherally spaced spline keys 63 slidably interfitting with similar keys 64 in a sleeve member 65. The latter has an outer concentric sleeve 66 with internal uniformly peripherally spaced keys 67 slidably interfitting with similar keys 68 on the periphery of a sleeve 69 telescoping with the sleeve 66. Both sets of keys 67 and 68 are parallel to the axis of rotation. The sleeve 69 is formed on a disk 70 having an opening 71 interfitting with milled diametrically opposed notches 72 in the adjacent end of the intermediate shaft section 47.

Preferably, the couplings between the shaft sections 47 and 46, and 45 and 44 are similar, the first comprising keys 73 and 74, sleeves 75 and 76, keys 77 and 78, a sleeve 79 and a disk 80 having an opening 81 interfitting with notches 82 in the section 46, and the second comprising keys 83 and 84, sleeves 85 and 86, keys 87 and 88, a sleeve 89 and a disk 90 having an opening 91 interfitting with notches 92 in the inner end of the outlet shaft section 44.

In each instance, the disk (70, 80 or 90) is held removably in endwise position between the end faces of the associated notches (72, 82 or 92) and the adjacent end of the opposed shaft section (48, 47 or 45). As in the case of the driving shaft assembly 9, the parts of the driven shaft assembly 10 may be readily assembled and disassembled upon removal of the bearing 49 and the cover plate 53.

The shaft sections 46 and 45 are connected by an overrunning clutch 93 which comprises concentric inner and outer coupling members 94 and 95 keyed respectively to the adjacent ends of the sections. The inner member 94 is formed in its periphery with wedge notches 96 in which wedge rollers 97 are disposed. The construction is similar to that shown in Fig. 8.

The high speed drive is taken from the inlet shaft section 14, and passes through the primary or high speed clutch 11, a gear 106 freely rotatable on the intermediate shaft section 15 and held against endwise movement between the clutch 12 and the disk 32, and a gear 107 integral with the shaft section 48 and meshing with the gear 106. The ratio between the gears 106 and 107 is relatively low so that the clutch 11 is subjected to a relatively high torque through the driven shaft assembly 10.

The clutch 11 may be of any suitable overload type. In its preferred form, the clutch 11 comprises two annularly arranged sets of opposed ratchet teeth 107$^a$ and 108 constituting clutch elements adapted for relative movement axially of the shaft section 14 into and out of coacting engagement. Preferably, the teeth 107$^a$ and 108 have steep engaging faces with inclined backs. The clutch teeth 107$^a$ are formed on one end face of a large annular disk 109 which is rigid with the sleeve member 28, and which derives its drive through the keys 26 and 27 from the shaft section 14. The other clutch teeth 108 are integral with one side of the gear 106. Hence, the clutch element 108 is fixed, and the element 107$^a$ is movable axially of the shaft section 14. The keys 26 and 30 are of sufficient length to fully engage with the keys 27 and 31 in all positions of the clutch element 107$^a$ so that the drive to the intermediate shaft section 15 is maintained at all times. Preferably, an annular groove 110 is formed in one side of the gear 106 to receive the free end of the sleeve 29 when the clutch 11 is closed.

Figure 1:
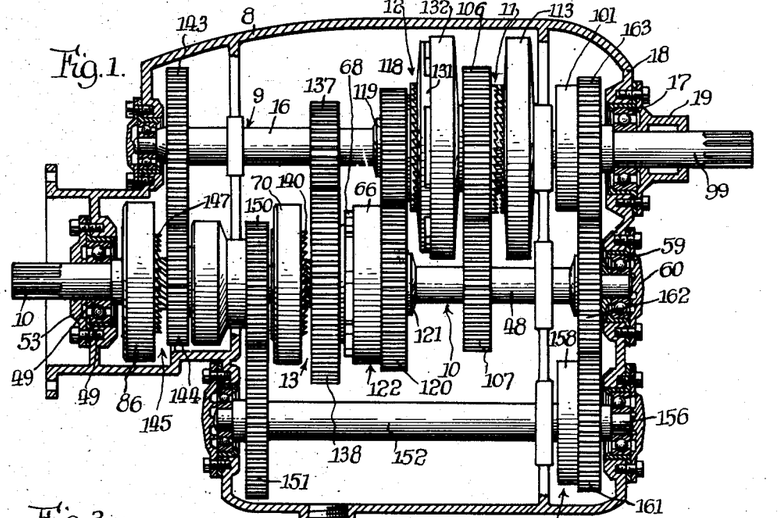
Figure 1 is a side elevational view, with the casing in section, of a transmission embodying the features of my invention.
Figure 2:
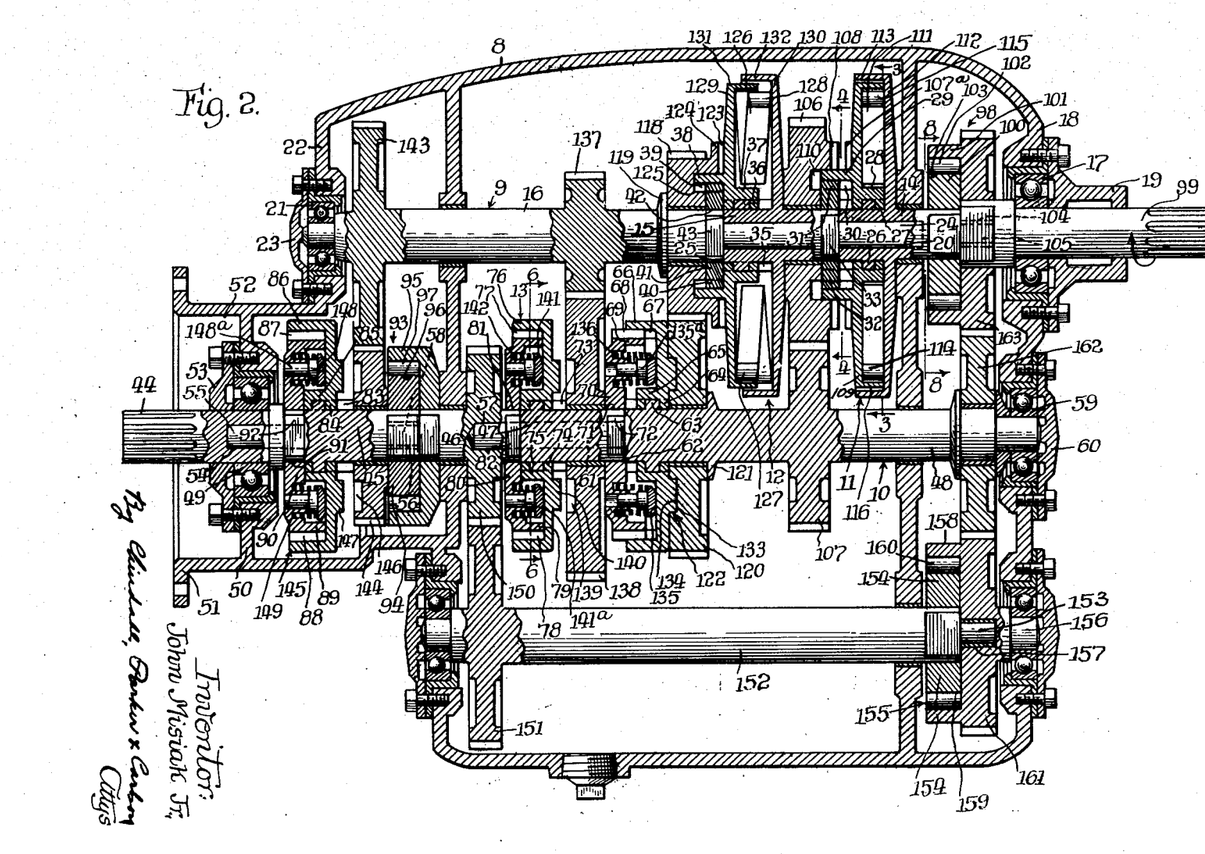
Fig. 2 is a full vertical sectional view of the transmission adjusted for an intermediate speed drive.
Figure 3:
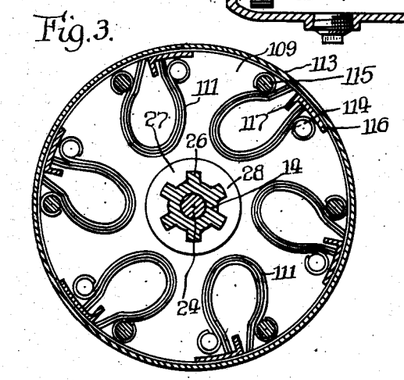
Fig. 3 is a transverse sectional view of one of the automatic overload clutches taken along line 3—3 of Fig. 2.
Figure 4:
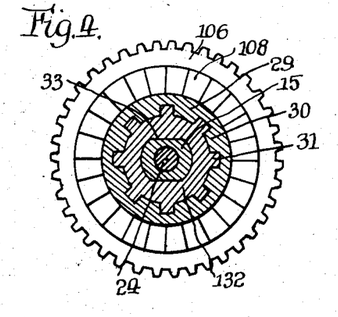
Fig. 4 is a transverse sectional view of one of the shaft couplings taken along line 4—4 of Fig. 2.
Figure 5:
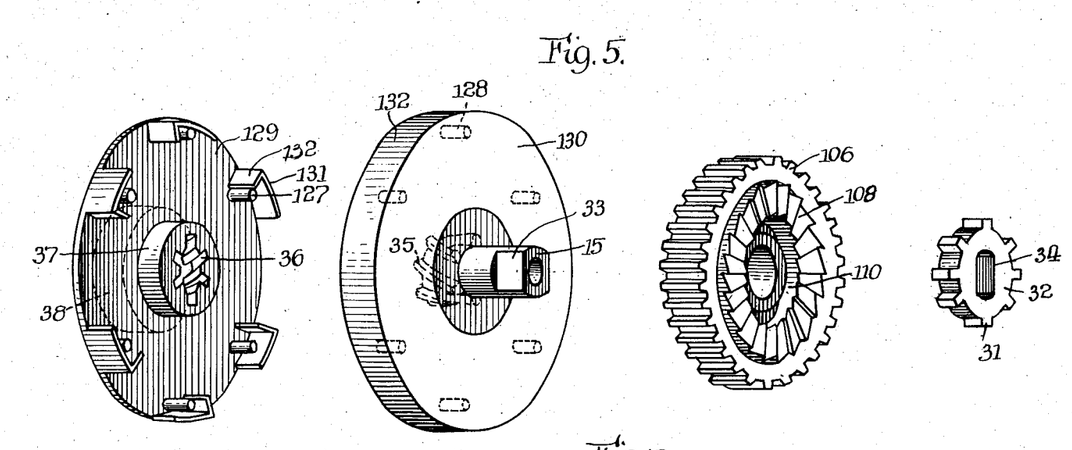
Fig. 5 is a perspective view of one of the automatic overload clutches and the associated shaft coupling in disassembled relation.

The clutch element 107$^a$ tends to move from the element 108 in response to the drive resistance or rotational torque to which it is subjected. Preferably, the keys 26 and 27 constitute wedge means tending as an incident to the drive to open the clutch 11, and to this end are slightly inclined or helical in one direction relative to the axis of rotation. The separating action is opposed by yieldable means tending to effect movement of the clutch element 107$^a$ toward the element 108. In the present instance, the yieldable means comprises a plurality of sets of compression leaf springs 111 tending to rotate the clutch element 107$^a$ about the shaft section 14 in a direction to advance the element 107$^a$ along the keys 26. The springs 111 (see Fig. 3) are disposed in uniformly peripherally spaced relation about the sleeve member 28, and between the clutch disk 109 and an opposed parallel backing disk or plate 112 integral and concentric with the inlet shaft section 14. An annular peripheral flange 113 on one side of the disk 112 serves to enclose the spring space. The springs 111 of each set are U-shaped in form and nested, with their ends extending outwardly and anchored respectively to two spaced pins 114 and 115 rigid with the disks 109 and 112. A plurality of lateral projections 116 extend from the disk 109 just inside the flange 113 and respectively over the pins 114. Each projection 116 is angle-shaped, having an inwardly extending flange 117. The number of springs 111 in each set may be varied to adjust the closing action of the clutch 11. Of each nest of springs 111, one end extends freely to the interior of the flange 113, and the other end extends to the inner surface of the associated projection 116, and is confined between the pin 114 and the flange 117 for movement with the disk 109.

In operation, the sleeve member 28 is subjected to torque in overcoming the load on the driven shaft assembly 10. This torque, due to the wedge faces of the keys 26 and 27 imparts an axial thrust on the clutch element 107$^a$ tending to open the clutch 11 against the resistance of the springs 111. When the load is in excess of a predetermined value, for example, the maximum normal load under which a motor vehicle should operate in high gear, the clutch 11 will be open. This predetermined value is dependent on the pressure of the springs 111, and is subject to adjustment. As the load decreases to below this value, the axial thrust imparted by the keys 26 and 27 decreases accordingly, and the springs 111 act to rotate the sleeve 28 relatively to the disk 112 in a clockwise direction as viewed in Fig. 3, thereby advancing the clutch element 107$^a$ by a screw action along the keys 26 into operative engagement with the clutch element 108. The springs 111 will suffer a slight lateral flexure to permit the attendant separation of the disks 109 and 112.

The intermediate speed drive is taken from the intermediate shaft section 15, and passes through the secondary or intermediate speed clutch 12, a gear 118 freely rotatable on the shaft section 16 and held against axial movement between a peripheral flange 119 on the latter and the disk 41, a gear 120 freely rotatable in fixed axial position between the keys 63 and a peripheral flange 121 on the shaft section 48, and a clutch 122 to the intermediate shaft section 47. In the intermediate speed drive, the gear ratio is higher, and the torque to which the clutches 11 and 12 are subjected is lower for a given load than in the previously described high speed drive.

The clutch 12 may be of any suitable overload type. Since it serves the same function in the intermediate speed drive as does the clutch 11 in the high speed drive, both clutches preferably are alike in construction. Thus, the clutch 12 comprises two annular end face elements 123 and 124 which are formed respectively on the sleeve member 37 and on one side of the gear 118, and which have opposed ratchet teeth. The gear 118 is formed with an annular groove 125 adapted to receive the free end of the sleeve 38 when the clutch 12 is closed. The axial position of the clutch element 123 is automatically controlled by the keys 35 and 36 which are inclined or helical to convert the torque partially into an axial thrust component tending to open the clutch 12, and by a plurality of U-shaped compression springs 126, anchored at their free ends to pins 127 and 128 respectively on a disk 129 rigid with the element 123 and an opposed disk 130 integral with the shaft section 15, and tending to rotate the sleeve 37 on the shaft section 15 to advance the clutch element 123 by a screw action into engagement with the element 124. The disk 129 has a plurality of lateral projections 131, one for each set of springs 126, and the disk 130 has an annular side flange 132 overlying the projections.

The clutches 11 and 12 operate in the same way. However, due to the increased gear ratio in the intermediate speed drive, the load on the driven shaft assembly 10 at which the clutch 12 will open is greater than that necessary to open the clutch 11. The sequence in which the clutches 11 and 12 operate may also be varied by selectively adjusting the action of the respective sets of springs 111 and 126.

It will be evident that when the clutch 11 is closed, the clutch 12 will also be closed. To prevent both clutches 11 and 12 from being connected simultaneously to the driven shaft assembly 10, the second clutch 122 is interposed in the intermediate speed drive. The clutch 122 in its preferred form comprises two annular end face elements 133 and 134 which are rigid respectively with the adjacent sides of the gear 120 and the sleeve 65, and which are formed respectively with coacting ratchet teeth. It will be evident that the clutch element 134 is constantly connected to the intermediate shaft section 47, and is movable axially into and out of engagement with the element 133. Yieldable means tends to close the clutch 122. In the present instance, this means comprises a ring 135 encircling the sleeve 65 and having a plurality of parallel annularly arranged plungers 135a slidable in the disk 70. Springs 136 disposed about the plungers 135a and confined between the disk 70 and the ring 135 press the latter against the member 65. However, the spline keys 63 and 64 control the position of the clutch element 134 automatically in response to the reaction of the shaft section 47. Thus, the keys 63 and 64 are slightly inclined or helical relative to the axis of rotation, the direction of inclination being such that power rotation of the shaft section 48 against the resistance of the section 47 will impart an axial thrust on the clutch element 133 to open the clutch 122. When the drive to the section 48 is disconnected, the springs 136 will close the clutch 122.

The low speed drive, which is adapted to carry the maximum load, as for example in starting a motor vehicle, is taken from a gear 137 rigid with the shaft section 16, through a gear 138 meshing with the gear 137 and freely rotatable in fixed axial position on the intermediate shaft section 47 between the disk 70 and the keys 73, and the low speed clutch 13, to the intermediate shaft section 46.

The clutch 13 preferably is the same in construction as the clutch 122. Thus, the clutch 13 comprises opposed annular clutch elements 139 and 140 which are rigid respectively with the gear 138 and the sleeve 75, and which are formed with coacting ratchet teeth. A ring 141 having plungers 141a slidably mounted in the disk 80 is pressed by springs 142 against the clutch element 140, and tend to urge the latter into engagement with the element 139. The spline keys 73 and 74 are inclined or helical, so that when the shaft section 47 is disconnected from the inlet shaft assembly 9, the clutch 13 will close automatically under the action of the springs 142, and when the section 47 is driven it will overrun the sleeve 75 to open the clutch 13.

Means may be provided, if desired, for automatically utilizing the braking action of the motor when the power therefrom is discontinued. Such means is shown in the present instance, and comprises a gear 143 fixed on the shaft section 16 and meshing with a gear 144 freely rotatable in fixed endwise position on the intermediate shaft section 45 between the clutch 93 and the keys 83. An automatic clutch 145 is adapted to connect the gear 144 to the outlet shaft section 44.

Figure 6:
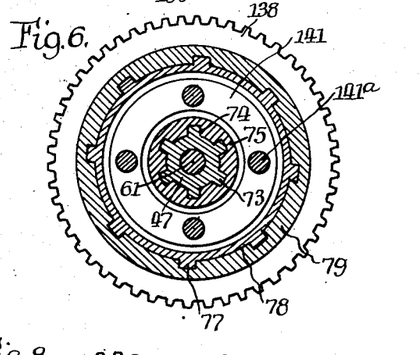
Fig. 6 is a transverse sectional view of one of the overrunning clutches in the driven shaft assembly and the associated coupling taken along line 6—6 of Fig. 2.
Figure 7:
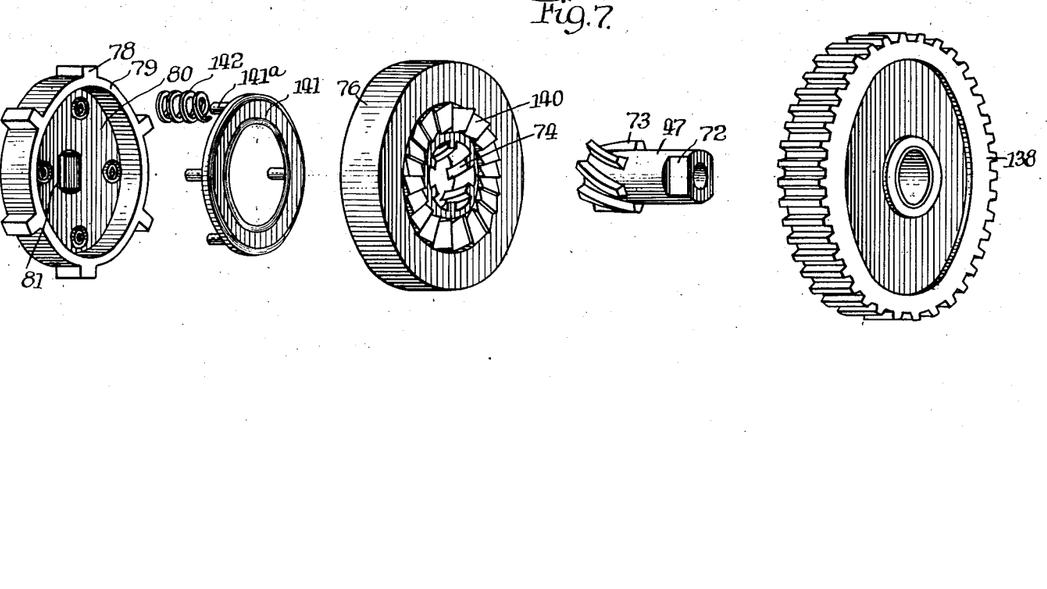
Fig. 7 is a perspective view of the construction illustrated in Fig. 6 with the parts in disassembled relation.

Preferably, the clutch 145 is the same in construction as the clutches 122 and 13. More particularly, the clutch 145 comprises annular end face clutch elements 146 and 147 which are integral respectively with the gear 144 and the sleeve 85, and which are formed respectively with coacting ratchet teeth orientated to effect a drive in a counterclockwise direction as viewed in Fig. 6. A ring 148 having plungers 148a slidable in the disk 90 is urged by springs 149 against the clutch element 147, and tend to move the latter into engagement with the element 146. The keys 83 and 84 are helical or inclined in a direction such that, when the power drive to the shaft section 45 is discontinued, the rotation of the outlet shaft section 44 through the momentum of the driven part, as for example the motor vehicle, will cause the clutch 145 to close, and when the power drive is operative, the shaft section 45 will overrun the shaft section 44 to open the clutch 145. If the driven part is idle, the springs 149 will close the clutch 145. As a result, when the power drive is discontinued, the source of power, as for example the engine, resists rotation of the outlet shaft section 44 to brake the driven part.

The clutch 145 serves to connect the shaft section 44 through the gears 144 and 143 to the shaft assembly 9 and then through the clutch 11 to the driven shaft assembly 10. Rigid with the shaft section 46 is a gear 150 which meshes with a gear 151 fixed on a back shaft 152. The latter is parallel to the shaft assemblies 9 and 10 and is journaled at one end in the wall 22. The other end of the shaft 152 has a reduced axial extension 153, and is keyed to the inside element 154 of an overrunning clutch 155. A short shaft 156 journaled in the end wall 18 has an axial bore 157 receiving the projection 153, and carries the outside element 158 of the clutch 155. Disposed in notches 159 in the periphery of the clu ch element 154 are wedge rollers 160 adapted to lock the clutch 155 upon rotation of the shaft 152 in a counterclockwise direction. A gear 161 rigid with the element 158 is connected through a gear 162 rotatable on the shaft section 48 to a gear 163 rigid with the clutch element 101. Preferably, all of the clutches 98, 93 and 155 are alike in construction.

The gear 107 bears a ratio to the gear 106 the same as that of the gear 150 to the gear 151. All of the gears 161, 162 and 163 are the same in size. Hence, the elements 100 and 101 are rotated at the same speed when the transmission is driven from the shaft section 44.

The operation of the transmission will be evident from the foregoing, and briefly described is as follows:

With the driving and driven shaft assemblies 9 and 10 stationary, all of the clutches are closed. When power is applied to the shaft 99, the overrunning clutch 98 operates to drive the shaft assembly 9 in a clockwise direction. Initially, the high speed drive through the clutch 11 takes up the small amount of slack or lost motion in the clutches, and then causes the clutches 12, 13, 122 and 145 to open. It will be understood that the overrunning clutch 93 maintains the drive connection to the outlet shaft section 44 in a counterclockwise direction. However, after the slack has been taken up, the resistance to movement of the driven part acts through the driven shaft assembly 10 to exert a heavy torque which causes the high speed clutch 11 to open. The clutches 12 and 122 tend to close through the action of the springs 126 and 136, but fail to establish the intermediate speed drive since the torque is still too great. The low speed clutch 13, however, closes in response to the action of the springs 142, and hence the low speed drive is connected. It will be understood that the clutch 145 remains open at all times during the drive of the shaft section 44 from the driving shaft assembly 9.

As the speed of the driven part is increased, less power is required, and hence the driving torque is gradually decreased until the clutches 12 and 122 close automatically. Thereupon, the drive is transmitted at an intermediate speed to the driven shaft assembly 10. The initial drive of the shaft section 47 causes the low speed clutch 13 to open automatically.

The speed continues to increase until the torque is reduced to the point where the clutch 11 automatically closes. Now, the drive is transmitted at a high speed through the clutch 11 to the driven shaft assembly 10. The initial drive of the shaft section 48 causes the intermediate speed clutch 122 to open. Thus, the transmission automatically selects the proper gear ratio for a given load. In accelerating from one speed to another, the momentum is increased to a point such that the torque necessary to drive the shaft 44 is reduced sufficiently to compensate for the change in gear ratio.

It will be understood that the driving torque is determined by the degree of power applied to the inlet shaft 99. When the momentum of the car is increased, less power is required. In any speed, a sudden or sharp acceleration may increase the torque to a point that the drive will shift.

When the power is discontinued to stop the drive, the momentum of the driven part causes the shaft section 44 to continue rotating in a counterclockwise direction. As a result, the braking clutch 145 closes to drive the shaft section 16. The sections 16 and 15 respectively overrun the sections 15 and 14 to lock the clutches 11 and 12 in closed position so that the driving shaft assembly 9 rotates as a unit. From the shaft assembly 9, the drive is transmitted to the shaft section 48. Hence, the clutches 13 and 122 are open. The drive continues from the shaft assembly 10 through the back shaft 152, the clutch 155 and the gears 161, 162 and 163 to the shaft 99, thereby utilizing the motor or source of power to brake the movement of the driven part.

While I have shown clutches of the positive type, it will be understood that friction clutches may be used. Also, by eliminating or interrupting the back drive through the shaft 152, free wheeling characteristics can be obtained.

I claim as my invention:

1. An automatic adjustable-speed gear transmission comprising, in combination, two axially aligned drive shaft sections coupled together for joint rotation, two axially aligned driven shaft sections coupled together for joint rotation, a relatively low speed gear connection between one of said drive sections and one of said driven sections and including an automatic clutch adapted to open in response to a drive from the other driven section, and a relatively higher speed gear connection between the other of said drive sections and said other driven section and including an automatic overload clutch adapted to open in response to a torque in excess of a predetermined value and to close in response to a torque below said value.

2. An automatic adjustable-speed gear transmission comprising, in combination, two axially aligned drive shaft sections coupled together for joint rotation, two axially aligned driven shaft sections coupled together for joint rotation, a relatively low speed gear connection between one of said drive sections and one of said driven sections, an automatic clutch in said connection and adapted to close in response to a spring pressure and having an actuator operable by the other driven section to open said clutch against the spring pressure in response to a drive from the other driven section, and a higher speed gear connection between the other of said drive sections and said other driven section and including an automatic overload release clutch and an automatic clutch in series, said overload clutch being adapted to open in response to a torque in excess of a predetermined value and to close in response to a torque below said value, said last mentioned automatic clutch being adapted to close in response to spring pressure.

3. An automatic adjustable-speed gear transmission comprising, in combination, three axially aligned drive shaft sections coupled together for joint rotation, three axially aligned driven shaft sections connected together for joint rotation by couplings permitting a limited lost motion between each set of adjacent sections, a low speed gear connection adapted to connect one drive section to one driven section and including a normally closed automatic clutch which will open in response to the intermediate driven section overrunning said one driven section, an intermediate speed gear connection for connecting the intermediate drive section to said intermediate driven section and including an automatic overload clutch responsive to the torque of said drive sections, and including a normally closed automatic clutch which will open in response to said other driven section overrunning said intermediate driven section, and a high speed gear connection for connecting the other drive section to said other driven section and including an automatic overload clutch responsive to the torque of said drive sections.

4. An automatic adjustable-speed transmission comprising, in combination, three axially aligned drive shaft sections coupled together for joint rotation, three axially aligned driven shaft sections, a plurality of lost motion couplings connecting said driven sections for joint rotation, a low speed connection adapted to connect one drive section to one driven section and including an automatic clutch adapted to open when the intermediate driven section overruns said one driven section through the lost motion in the connection coupling, an intermediate speed connection for connecting the intermediate drive section to said intermediate driven section and including an automatic overload clutch responsive to the torque of said drive sections, and including an automatic clutch adapted to open when said other driven section through the lost motion in the connecting coupling overruns said intermediate driven section, and a high speed connection for connecting the other drive section to said other driven section and including an automatic overload clutch responsive to the torque of said drive sections.

5. An automatic adjustable-speed gear transmission comprising, in combination, a power inlet and a power outlet, each having a plurality of axially aligned shaft sections connected for joint rotation, a plurality of parallel gear connections of different gear ratios for connecting the respective shaft sections of said inlet to the respective shaft sections of said outlet, the connection of the lowest gear ratio including an automatic clutch adapted to open in response to a drive from the other connections, the connection of the next lowest gear ratio including an automatic overload clutch adapted to open in response to a torque in excess of a predetermined value and to close in response to a torque below said value.

6. An automatic adjustable-speed transmission comprising, in combination, a power inlet and a power outlet, each having a plurality of axially aligned shaft sections connected for joint rotation, a plurality of parallel connections of different speed ratios for connecting the respective shaft sections of said inlet to the respective shaft sections of said outlet, one connection of a relatively low speed ratio including an automatic clutch adapted to open in response to a drive from a connection of a higher speed ratio, said last mentioned connection including an automatic overload clutch adapted to open in response to a torque in excess of a predetermined value and to close in response to a torque below said value.

7. An automatic adjustable-speed transmission comprising, in combination, a power inlet, a power outlet, and a plurality of parallel drive connections of different speed ratios selectively available to connect said inlet to said outlet, said connections respectively including automatic clutches adapted to be closed by spring pressure and having actuators operable from said power inlet to permit closing of said clutches in a predetermined sequence in response to a progressive decrease in torque on the power inlet to close said connections successively in the order of increasing speed ratios.

8. An automatic adjustable speed transmission comprising, in combination, a drive shaft assembly having a plurality of interconnected shaft sections, a driven shaft assembly having a plurality of interconnected shaft sections, and a plurality of drive connections from the respective drive shaft sections to the respective driven shaft sections, said connections respectively including a plurality of automatic clutches adapted to be closed by spring pressure and having actuators operable from said drive shaft to permit closing of said clutches in a predetermined sequence upon a progressive decrease in torque on said drive shaft to complete said connections successively.

9. An automatic adjustable speed transmission comprising, in combination, a power inlet, a power outlet, and a plurality of parallel drive connections of different speed ratios selectively available to connect said inlet to said outlet, said connections respectively including automatic clutches adapted to be closed by spring pressure and having actuators operable from said power inlet to permit closing of said clutches in a predetermined sequence in response to a progressive decrease in torque on the power inlet to close said connections successively in the order of increasing speed ratios, each connection upon closing effecting the opening of any other connection of a lower speed ratio.

10. An automatic adjustable speed transmission comprising, in combination, a drive shaft assembly having a plurality of interconnected shaft sections, a driven shaft assembly having a plurality of interconnected shaft sections, a plurality of drive connections from the respective drive shaft sections to the respective driven shaft sections, said connections respectively including a plurality of automatic clutches adapted to be closed by spring pressure and having actuators operable from said drive shaft to permit closing of said clutches in a predetermined sequence upon a progressive decrease in torque on said drive shaft to complete said connections successively, and a connection for driving said drive shaft assembly from said driven shaft assembly and including an automatic reverse clutch operable to close when said driven shaft assembly overruns said drive shaft assembly, and to open when said drive shaft assembly overruns said driven shaft assembly.

11. In a transmission, in combination, two axially aligned shaft sections, a coupling member keyed to one of said sections, a second coupling member having a helical spline connection with the other of said sections permitting axial movement of said second member, a spline connection between said members permitting relative axial movement therebetween, a gear freely rotatable on said other section, and two opposed annular end face clutch elements with coacting teeth rigid respectively with said second coupling member and said gear and constituting an automatic clutch adapted through the action of said helical spline connection to open when said other section overruns said one section and to close when said one section overruns said other section.

12. In a transmission, in combination, two axially aligned shaft sections, a coupling member rotatable with one of said sections, a second coupling member having a spline connection with the other of said sections permitting a limited rotary axial movement of said second member over said other section, a spline connection between said members permitting relative axial movement therebetween, and two opposed clutch elements, one of said elements being rigid with said second coupling element member for movement into and out of coacting engagement with the other of said elements, said elements constituting an automatic clutch adapted through the action of said first mentioned spline connection to open when said other section overruns said one section and to close when said one section overruns said other section.

13. In a transmission, in combination, two axially aligned rotary shaft sections, a first coupling member fixed for rotation with one of said sections, a second coupling member splined for axial movement on the other of said sections and connected to said first coupling member for rotation therewith, and a clutch for driving said second member, said clutch including a driving element, and a driven element rigid with said second coupling element for rotation therewith.

14. In a power transmission, a shaft assembly comprising a plurality of axially aligned end and intermediate sections splined together for joint rotation, one end section having an axial bore, the other end section having a reduced axial extension projecting into said bore, and each intermediate section being tubular in form and disposed on said extension between said end sections, all of said sections being in end abutment.

15. In a power transmission, a shaft assembly comprising a plurality of separable axially aligned shaft sections mounted in interfitting and self-aligning relation, and means coupling said sections for joint rotation, and permitting a limited relative rotation between said sections.

16. In a power transmission, a shaft assembly comprising a plurality of separable axially aligned shaft sections one section having an axial bore in one end, another section rotatably extending at one end into said bore, and coupling means connecting said sections for joint rotation, and providing a limited angular lost motion therebetween.

17. In a power transmission, a shaft assembly comprising a plurality of axially aligned end and intermediate sections, one end section having an axial bore, the other end section having a reduced axial extension rotatably projecting into said bore, and each intermediate section being tubular in form and rotatably disposed on said extension between said end sections, and a plurality of couplings respectively connecting the adjacent sections for joint rotation, and permitting relative rotation therebetween through a limited lost motion.

18. In a power transmission, a shaft assembly comprising a plurality of axially aligned end and intermediate sections, one end section having an axial bore, the other end section having a reduced axial extension rotatably projecting into said bore, and each intermediate section being tubular in form and rotatably disposed on said extension between said end sections, all of said sections being in end abutment, and a plurality of couplings connecting said sections of joint rotation, each coupling comprising two members encircling adjacent sections and having an axially slidable key connection with each other, and axially slidable key connections respectively with said adjacent sections, said sections and said coupling members being held in assembled relation by said end sections and being subject to disassembly by relative axial stripping movement.

19. In a power transmission, a shaft assembly comprising a plurality of axially aligned end and intermediate shaft sections, and a plurality of couplings connecting said sections for joint rotation, each coupling comprising two members encircling adjacent sections and having an axially slidable key connection with each other and axially slidable key connections respectively with said adjacent sections, said sections and said coupling members being held in assembled relation by said end sections and being subject to disassembly by relative axial stripping movement.

20. A clutch comprising, in combination, an axially fixed driven clutch element having an annular end face with serrated clutch teeth, a drive shaft, a driving clutch element having an annular end face with serrated clutch teeth adapted to coact with said first mentioned teeth, and having a spline connection with said shaft permitting axial movement of said driving element into and out of engagement with said driven element, said spline connection being helical to resolve the torque of said driving element into an axial component of thrust tending to urge said elements apart, and spring means tending to urge said driving element into engagement with said driven element.

21. A clutch comprising, in combination, a driven clutch element having an annular end face, a drive shaft, a driving clutch element having an annular end face adapted to coact with said first mentioned face and having a spline connection with said shaft permitting axial movement of said driving element into and out of engagement with said driven element, said spline connection having a face inclined to the axis of rotation and adapted to resolve the torque of said driving element into an axial component of thrust tending to urge said elements apart, and spring means tending to urge said driving element axially into engagement with said driven element.

JOHN MISIAK, Jr.

CERTIFICATE OF CORRECTION.

Patent No. 2,042,235.

May 26, 1936.

JOHN MISIAK, JR.

It is hereby certified that error appears in the printed specification of the above numbered patent requiring correction as follows; Page 5, second column, line 53-54, claim 4, for the word "connection" read connecting; and lines 60-61, claim 4, strike out the words "through the lost motion in the connecting coupling" and insert the same after "section" and before the comma in line 62, same claim; page 6, second column, line 38, claim 12, strike out the word "element"; and that the said Letters Patent should be read with these corrections therein that the same may conform to the record of the case in the Patent Office.

Signed and sealed this 25th day of August, A. D. 1936.

Leslie Frazer

Acting Commissioner of Patents.

(Seal)